(No Model.)
C. A. FLOYD.
HANSOM CAB.
No. 333,845. Patented Jan. 5, 1886.
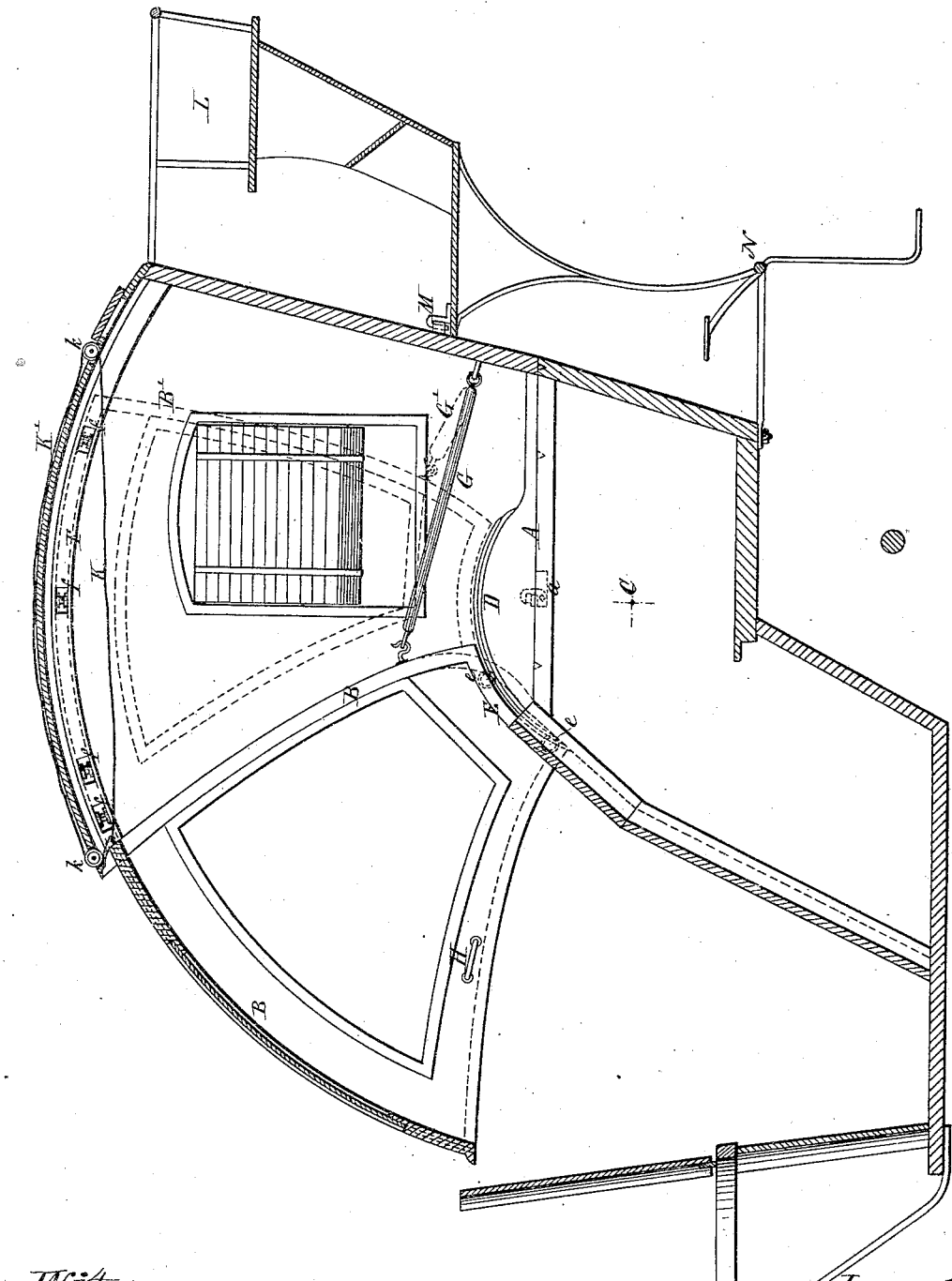
Witnesses:
Fred Hellot
J. B. Lawyer
Inventor:
Charles A. Floyd
By C. S. Whitman
Attorney.

UNITED STATES PATENT OFFICE.

CHARLES ASHBURNHAM FLOYD, OF EASTBOURNE, COUNTY OF SUSSEX, ENGLAND.

HANSOM-CAB.

SPECIFICATION forming part of Letters Patent No. 333,845, dated January 5, 1886.

Application filed October 13, 1885. Serial No. 179,746. (No model.)

*To all whom it may concern:*

Be it known that I, CHARLES ASHBURNHAM FLOYD, a citizen of England, residing at Eastbourne, in the county of Sussex, England, have invented a new and useful Improvement in Hansom-Cabs, of which the following is a specification.

In the specification of my Patent No. 319,216, issued June 2, 1885, I have described the application to a hansom-cab of a segmental hood mounted on centers at each side of the seat of the cab, on which it could be turned, so as to be withdrawn within the roof of the cab, or protruded outward and downward, so as to give shelter to the passengers.

My present invention relates to a modified construction of such a cab and its hood in such manner that the roof and hood can be bodily removed, converting the cab into an open vehicle, as I will explain, referring to the accompanying drawing, which is a longitudinal section showing the cab with its roof and hood in position.

At about the line A, I make a horizontal division separating the roof part, or all above the division A, from the body part of the vehicle, or all below A. On the lower edge of the upper part I fix dowels or steady-pins, which enter holes in the upper edge of the lower part when the upper part is put on the lower part, and I provide any suitable catches—such as the turn-buckle or hook-catch *a*—to hold the two parts together.

In order to provide for the proper circular movement of the hood B without connecting it to the center C, as in my former patent, I make at each side of the upper part an inwardly-projecting circular segment, D, on which the lower edge, E, of the hood can run, preferably with anti-friction rollers *e* mounted in E. I also fix at each side of the upper part, close to the roof, a circular frame, F, with anti-friction grooved rollers *f* mounted in it, and in the grooves of these rollers runs a circular fillet projecting laterally from the periphery B of the hood.

In order partly to balance the weight of the hood, I hook to each side of it one end of a caoutchouc or helical spring, G, the other end of which is hooked to the back. The dotted lines B' G' indicate the hood and spring when the hood is retracted.

The passengers can move the hood by side handles, H. In order that the driver may also be able to move it, I provide a cord or strap, K, passing over guide-pulleys or through guide-eyes *k*, and presenting part of its length K' outside the roof, so that the driver sitting at L can, by drawing backward or forward this outside part, K', move the hood outward or inward. The framing of the driver's seat L is attached to the cab by hooks at M and bolts at N, so that it can be readily removed, and then all the upper part of the cab above A being removed the vehicle becomes an open one, and the passenger can drive.

Having thus described the nature of my invention and the best way I know of carrying the same into practice, I claim—

A cab made with its upper part, consisting of a roof and hood, separable from the lower part or body, substantially as and for the purpose herein set forth.

In testimony whereof I have signed my name to this specification in the presence of two subscribing witnesses.

C. ASHBM. FLOYD.

Witnesses:
 OLIVER IMRAY,
 G. H. HADDEN.